United States Patent
Feng et al.

(10) Patent No.: US 9,276,480 B2
(45) Date of Patent: Mar. 1, 2016

(54) OPTIMAL TRAJECTORY CONTROL FOR LLC RESONANT CONVERTER FOR LED PWM DIMMING

(71) Applicant: Virginia Tech Intellectual Properties, Inc., Blacksburg, VA (US)

(72) Inventors: Weiyi Feng, Blacksburg, VA (US); Fred C. Lee, Blacksburg, VA (US); Shu Ji, Blacksburg, VA (US)

(73) Assignee: Virginia Polytechnic Institute and State University, Blacksburg, VA (US)

( * ) Notice: Subject to any disclaimer, the term of this patent is extended or adjusted under 35 U.S.C. 154(b) by 259 days.

(21) Appl. No.: 14/140,008

(22) Filed: Dec. 24, 2013

(65) Prior Publication Data
US 2014/0312789 A1    Oct. 23, 2014

Related U.S. Application Data

(60) Provisional application No. 61/814,943, filed on Apr. 23, 2013.

(51) Int. Cl.
| | |
|---|---|
| H05B 37/00 | (2006.01) |
| H05B 39/00 | (2006.01) |
| H05B 41/00 | (2006.01) |
| H02M 3/335 | (2006.01) |
| H05B 33/08 | (2006.01) |
| H02M 1/00 | (2007.01) |
| H02M 3/337 | (2006.01) |

(52) U.S. Cl.
CPC ....... *H02M 3/33507* (2013.01); *H05B 33/0815* (2013.01); *H02M 3/337* (2013.01); *H02M 3/33561* (2013.01); *H02M 2001/0058* (2013.01); *Y02B 70/1433* (2013.01)

(58) Field of Classification Search
USPC ........................................... 315/186
See application file for complete search history.

(56) References Cited

U.S. PATENT DOCUMENTS

| | | | | |
|---|---|---|---|---|
| 2010/0213859 A1* | 8/2010 | Shteynberg | ........ | H05B 33/0815 315/224 |
| 2011/0043121 A1* | 2/2011 | Matsuda | ............ | H05B 33/0839 315/224 |
| 2011/0148318 A1* | 6/2011 | Shackle | ............. | H05B 33/0815 315/291 |
| 2011/0193491 A1* | 8/2011 | Choutov | ............ | H05B 33/0803 315/291 |
| 2011/0309759 A1* | 12/2011 | Shteynberg | ........ | H05B 33/0815 315/201 |
| 2012/0062133 A1* | 3/2012 | Cubias | ............... | H05B 33/0809 315/201 |
| 2012/0286681 A1* | 11/2012 | Hausman, Jr. | ..... | H05B 41/2828 315/200 R |
| 2014/0009077 A1* | 1/2014 | Yoshimoto | ......... | H05B 33/0845 315/210 |
| 2014/0265913 A1* | 9/2014 | Chung | ............... | H05B 33/0815 315/291 |
| 2014/0300274 A1* | 10/2014 | Acatrinei | ........... | H05B 33/0815 315/85 |
| 2015/0257223 A1* | 9/2015 | Siessegger | ......... | H05B 33/0818 315/186 |

* cited by examiner

*Primary Examiner* — Adam Houston
(74) *Attorney, Agent, or Firm* — Whitham, Curtis, Christofferson & Cook, P.C.

(57) ABSTRACT

Pulse width modulation is provided for controlling a resonant power converter, particularly for dimming of light emitting diode arrays without loss of efficiency. Dynamic oscillation due to the beginning of a pulse width modulated pulse burst is limited by shortening of the first and/or last pulse of a pulse bust such that the first pulse of a subsequent pulse burst close to or to connect with a full load steady-state voltage/current trajectory of the power converter. Pulse shortening made be made substantially exact to virtually eliminate dynamic oscillation but substantial reduction in dynamic oscillation is provided if inexact or even performed randomly.

20 Claims, 15 Drawing Sheets

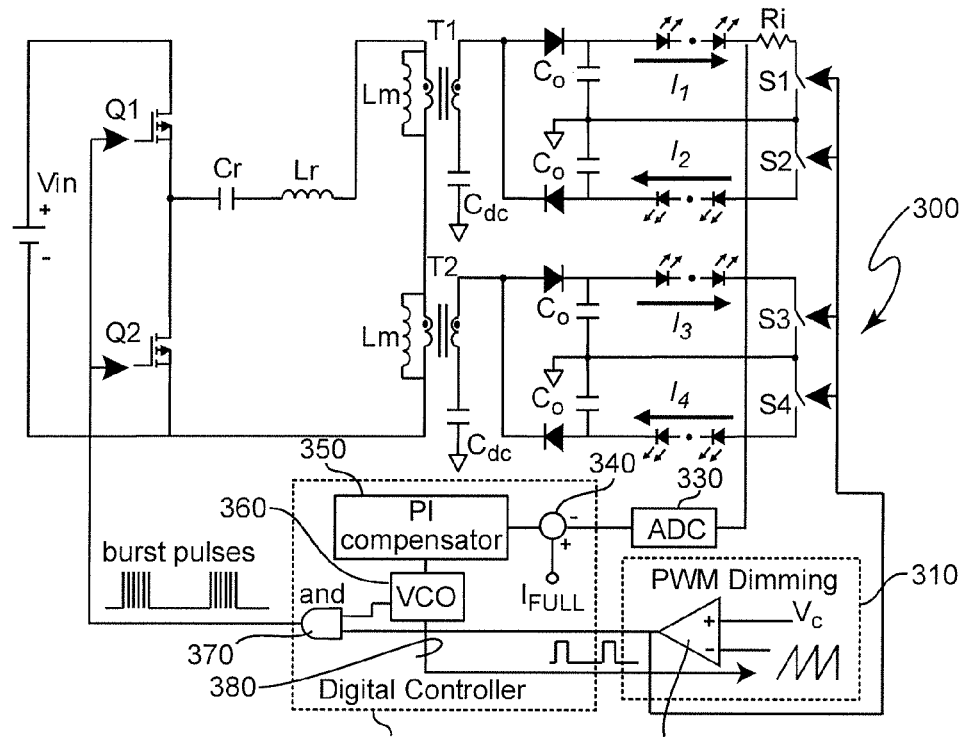

Figure 3

| | Parameters | Value |
|---|---|---|
| Initial Design | Input voltage | 380V |
| | LED full-load current $I_{Full}$ | 1A |
| | LED string full-load voltage | 48V |
| | Resonant frequency $f_e$ | 100kHz |
| | Inductor ratio $L_n = L_m/L_r$ | 5 |
| | Transformer turn ratio | 2:1 |
| | PWM dimming frequency | 200Hz |
| Resonant Tank | Resonant capacitor $C_r$ | 200nF |
| | Resonant capacitor $L_r$ | 123uH |
| | $T_1$ leakage inductor $L_{k1}$ | 3.2uH |
| | $T_2$ leakage inductor $L_{k2}$ | 3.4uH |
| | $T_1$ magnetizing inductor $L_{m1}$ | 336uH |
| | $T_2$ magnetizing inductor $L_{m2}$ | 335uH |
| Devices | Primary main switches | STD13NM60N |
| | Secondary schottky diode | PDS4150 |
| | Output switches $S_{1,2,3,4}$ | BCS123N08NS3 |

Figure 3A

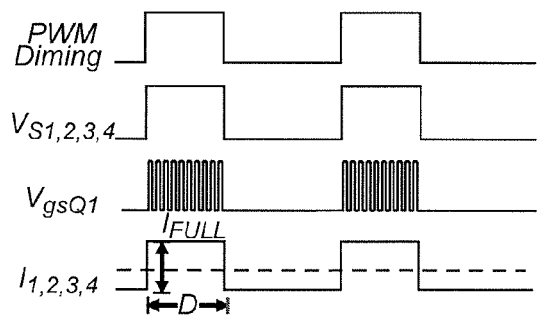

Figure 4

OPTIMAL TRAJECTORY CONTROL FOR LLC RESONANT CONVERTER FOR LED PWM DIMMING

CROSS-REFERENCE TO RELATED APPLICATIONS

This application claims benefit of priority of U.S. Provisional Application 61/814,943, filed Apr. 23, 2013, which is hereby incorporated by reference in its entirety.

FIELD OF THE INVENTION

The present invention generally relates to Illumination arrangements using light-emitting diodes (LEDs) and, more particularly, to operation of resonant power converters for providing power to such illumination arrangements.

BACKGROUND OF THE INVENTION

Light-emitting diodes (LEDs) have been known for use in indicators and selective electronic displays for many years. Many recent advances in the technology of light-emitting diodes (LEDs) has caused increased interest in using LEDs for purposes of illumination and, indeed, made LED arrays the illumination medium of choice for numerous applications such as exterior and interior area illumination and backlighting of display panels due to the efficiency, spectral content, long lifetime, eco-friendliness, mechanical durability, safety and efficiency compared to incandescent, fluorescent, mercury and sodium vapor and arc lighting and the like.

Another important quality of LEDs for many such illumination applications is the capability for full control of light output flux, sometimes referred to as dimming. However, dimming of LEDs presents some problems in the design of power supplies for LED arrays particularly in providing good uniformity of light output of all LEDs in an array and avoiding perceptible flickering consistent with high efficiency of the power supply. For example, driving LEDs individually or in long, series connected strings with individual discrete power supplies is cost prohibitive and generally would require complex cross-regulation to achieve acceptable uniformity of light flux. Also, since power supplies are designed for highest efficiency at a particular voltage and frequency, efficiency is often greatly reduced as voltage is controlled, particularly when that voltage control is achieved by frequency control in resonant power converters. Moreover, Also, since light output flux of LEDs terminates immediately upon interruption of current, duty cycle or pulse width modulation (PWM) must be performed at a switching cycle frequency above about 85 Hz whereas such a problem is not presented by incandescent bulbs which exhibit a decrease in light output flux over the period of filament cooling.

Among known designs of power converters, resonant switching power converters have become popular due to their ability to limit switching losses and electrical stresses during operation as well as providing very high efficiency. Among resonant power converters, so-called LLC resonant converters are becoming increasingly attractive because of their flexibility of application, simplicity, efficiency, the simplicity of their control the ability to deliver a range of voltages and the possibility, although difficult, of providing over-current protection.

Typically, an LLC resonant converter will comprise a pair of switching transistors operated in a complementary fashion and a resonant circuit comprising a capacitor and two inductors. An LLC resonant converter typically operates at a switching frequency near the resonant frequency, $f_0$ of the LLC circuit for highest efficiency. As an electrical load is increased and more power must be delivered, simple sensing and feedback of the output voltage to a voltage controlled oscillator (VCO) can be arranged to reduce the switching frequency and increase the voltage gain to automatically compensate for the increased required power and thus provide good voltage regulation over a wide range of current. By the same token, particular conditions of voltage, current or switching frequency can be sensed and the VCO can be controlled to increase the switching frequency to reduce gain of the power converter and thus provide over-current protection in a very simple and robust manner. However, while steady-state performance of resonant power converters is well-matched to power requirements of LEDs other than loss of efficiency due if switching frequency is used to control voltage, interruption of input or output of power as is necessary for PWM or duty cycle modulation (e.g. for dimming) causes transients in the resonant circuit that may have perceptible adverse effects on light output flux.

SUMMARY OF THE INVENTION

It is therefore an object of the present invention to provide a unitary, resonant power supply capable of providing high uniformity of light output flux of LEDs in an array and which is not significantly susceptible to transients caused by use of PWM for dimming.

It is another object of the invention to provide a switching pattern control that substantially avoids transient effects in a resonant power converter and thus permits use of PWM for dimming consistent with use of a resonant power converter.

It is a further object of the invention to maintain efficiency of a resonant power converter providing power to an LED array over a full range of dimming ratio.

In order to accomplish these and other objects of the invention, a method of operating a resonant power converter is provided comprising steps of generating a pulse waveform comprising pulses at a first frequency for controlling generation of switching signals to control application of input power to the power converter, generating a pulse width modulated signal comprising pulses of controllable duty cycle at a second frequency, and periodically interrupting the pulse waveform in accordance with said pulse width modulated signal wherein the first frequency is sufficiently greater than the second frequency to form pulse bursts from the pulse waveform, each pulse burst comprising at least three of said pulses.

In accordance with another aspect of the invention, a resonant power converter is provided comprising a switching circuit for connecting and disconnecting a resonant circuit and a source of power, a waveform generator for generating a pulse waveform to control the switching circuit, and a pulse width modulator for interrupting the pulse waveform to generate pulse bursts having at least three pulses in each pulse burst.

In accordance with a further aspect of the invention, a light emitting diode array including a resonant power converter is provided wherein said resonant power converter comprises a switching circuit for connecting and disconnecting a resonant circuit and a source of power, a waveform generator for generating a pulse waveform to control the switching circuit, and a pulse width modulator for interrupting the pulse waveform to generate pulse bursts having at least three pulses in each pulse burst.

BRIEF DESCRIPTION OF THE DRAWINGS

The foregoing and other objects, aspects and advantages will be better understood from the following detailed description of a preferred embodiment of the invention with reference to the drawings, in which:

FIG. 3 is a schematic diagram of an arrangement for controlling a $MC^3$ resonant power converter similar to that of FIG. 1 to include PWM switching, FIG. 3A is a table of parameters of the resonant power converter in accordance with FIG. 3 used for experimental verification of the efficacy of the invention for LED dimming, FIG. 4 illustrates waveforms of a control scheme for the power converter of FIG. 3 to provide pulse width modulated power to the LED array, FIGS. 5A and 5B respectively illustrate wave forms and a state trajectory of dynamic oscillation that can occur in the power converter of FIG. 4 when PWM is provided, FIGS. 6A and 6B respectively illustrate wave forms and a state trajectory of dynamic oscillation to avoid dynamic oscillation in accordance with the invention by control of a first pulse of a PWM pulse train in accordance with a first embodiment of the invention.

DETAILED DESCRIPTION OF A PREFERRED EMBODIMENT OF THE INVENTION

Figure 1:
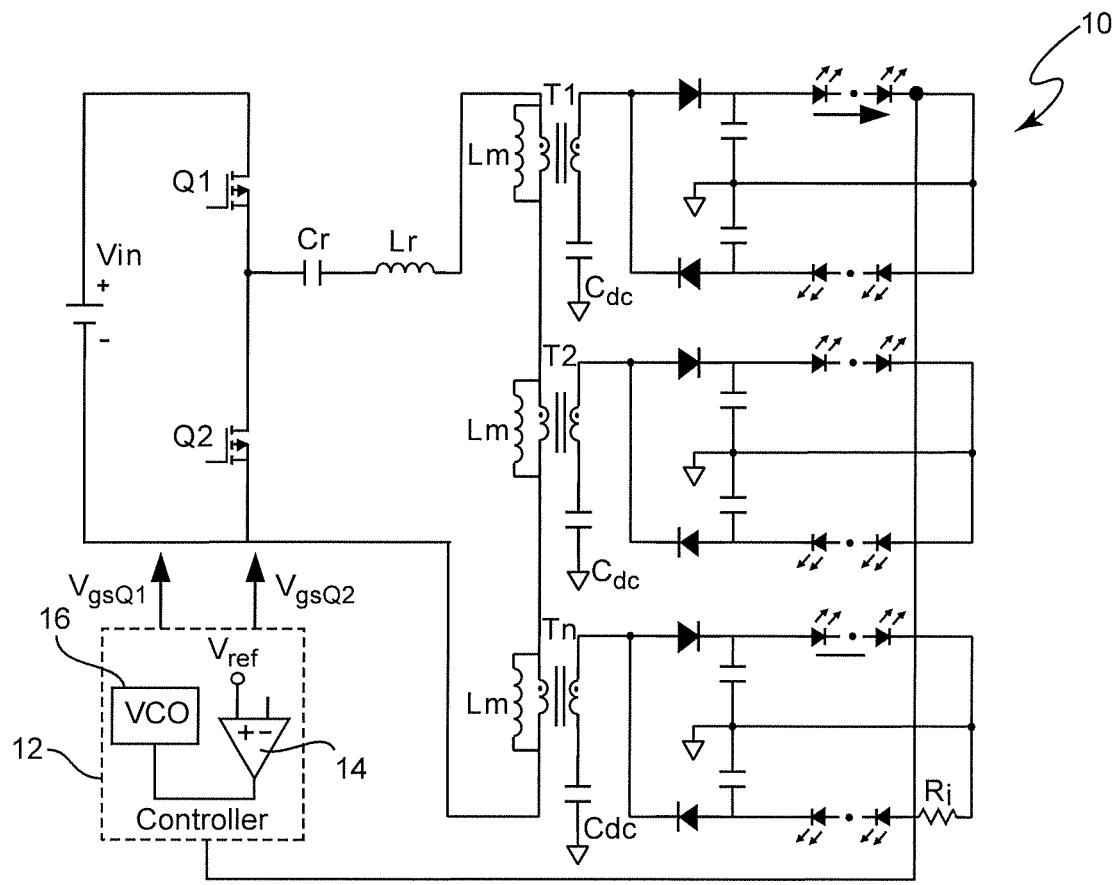
FIG. 1 is a schematic diagram of a multi-channel constant current ($MC^3$) resonant LLC power converter for driving an LED array.

Referring now to the drawings, and more particularly to FIG. 1, there is shown a schematic diagram of an exemplary resonant single stage multi-channel constant current ($MC^3$) power converter 10 useful for conveying an understanding the problems addressed by the invention. Since this power supply arrangement is somewhat similar in some aspects to some of the power supply arrangements disclosed in U.S. patent application Ser. No. 13/114,181, filed May 24, 2011, and a continuation-in-part thereof, U.S. patent application Ser. No. 13/930,200, filed Jun. 28, 2013, both of which are hereby fully incorporated by reference, no portion of FIG. 1 is admitted to be prior art in regard to the present invention. Specifically, while the power converter of FIG. 1 includes features of driving pairs of LED strings (a pair of LED strings constituting two channels) using voltage doubler circuits, series connection of transformer primary windings to ensure equal currents to all voltage doublers and LED strings, inclusion of DC blocking capacitors to ensure equal voltages and currents to both LED strings of each pair and control/cross-regulation of all strings of LEDs in accordance with monitoring of a single channel or LED string using resistance Ri in common with the power converters disclosed in the above-incorporated U.S. Patent Applications which also disclose numerous variations of such a power delivery arrangement which are applicable to and suitable for the present invention, the power converter topology is that of an LLC resonant power converter and a controller 12 is interposed in the current monitoring feedback path to achieve a variable dimming ratio. Use of the features in common with the power converters disclosed in the above-incorporated application allows variation in output light flux of LED strings in the array to be held within a very small percentage of each other even though the number of functional LEDs in each string may vary, as disclosed therein.

Controller 12 includes a difference amplifier 14 used as a voltage comparator to monitor the LED string current by comparing a voltage developed across resistor Ri with a reference voltage $V_{ref}$. The voltage difference is coupled to voltage controlled oscillator 16 which generates and adjusts the frequency of control signals $V_{gsQ1}$ and $V_{gsQ2}$ to control conduction of Q1 and Q2, respectively. In general, the switching frequency, $f_s$, will be designed to be equal to or very slightly less than the resonant frequency of the power converter under full load conditions. However, when $V_{ref}$ is adjusted to control dimming, the switching frequency is increased and the gain of the power converter is reduced so that a lower voltage will be delivered to the LED array; resulting in reduced current and a light load condition is presented to the power converter under a low dimming ratio (the ratio of dimmed light flux to maximum light flux).

Figure 2:
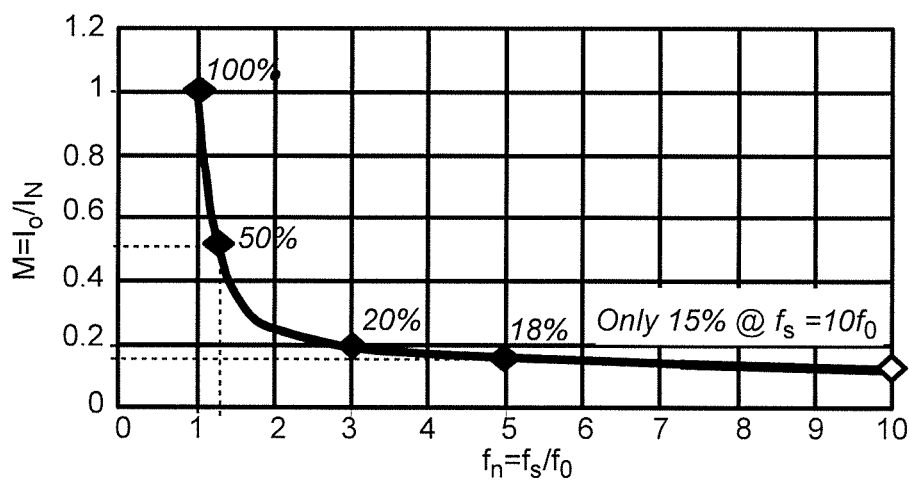
FIG. 2 is a graph of loss of efficiency of the power converter of FIG. 1 if switching frequency is used to control voltage.

A problem arises from the fact that, depending on the quality factor of the resonant circuit, a relatively large frequency shift is required to achieve a given reduction in voltage and resultant dimming ratio. For example, a ten-fold increase in switching frequency achieves only a 15% dimming ratio and efficiency drops quickly, as shown in FIG. 2, as switching frequency is increased. It should also be appreciated from the graph of FIG. 2 that extreme switching frequencies are required to achieve dimming ratios below 15%.

Referring now to FIG. 3, a pulse width modulation (PWM) approach 300 to LED array dimming with a resonant converter similar to that of FIG. 1 in accordance with the invention, is schematically illustrated. Only four channels, each channel including an LED string, are illustrated for simplicity. Otherwise, it may be assumed that the resonant power converters are identical and that as many channels as desired may be included. The only differences in FIG. 3 from the arrangement of FIG. 1 are in the PWM dimming circuit which can provide any arbitrarily low dimming ratio by reduction of the width of control pulses that control the length of pulse trains at an switching frequency close to the resonant frequency of the resonant power converter. As depicted, however, the current sensing resistor is illustrated as being in series with the uppermost LED string. This last difference is solely for clarity of illustration and is the electrical equivalent of the location of Ri in FIG. 1 since the LED string (or channel) used for current regulation is completely arbitrary. Since the switching frequency is substantially maintained and the power converter is operating at substantially full load during the arbitrarily short periods when power is applied to the LED array, substantially full operating efficiency is maintained regardless of the dimming ratio. It should be understood that the depiction of functional elements of the PWM LED dimming approach are arranged to convey an understanding of the principles of the invention and that many different circuits that will be evident to those skilled in the art can be used depending on design requirements and manufacturing economies.

The PWM approach to LED dimming begins with developing a PWM signal which can be accomplished, for example, by a circuit 310 which includes a comparator 320 receiving a control voltage $V_c$ and a ramp voltage. The comparator 320 outputs a "1" signal voltage if $V_c$ is greater than the ramp voltage and otherwise outputs a "0" signal voltage. Therefore, the comparator 320 will output a pulse train having a frequency which is the same as that of the ramp signal (e.g. 200 Hz but any frequency above about 85 Hz, as alluded to above, is suitable for avoiding flickering that is perceptible to the human eye) and lower values of $V_c$ will produce pulse of shorted duration and vice-versa.

Four switches S1-S4 are preferably used to control each respective LED string. The PWM signal output of comparator 320 is used to control S1-S4 to interrupt current in the respective LED strings for periods when the output of comparator 320 is at a "0" value. The same PWM signal is also input to digital controller 325 and serves to gate the control signals for switches Q1 and Q2 as will be discussed in greater detail below.

The magnitude information in the current sensing signal developed on resistor Ri is preferably converted to a digital signal at analog-to-digital converter (ADC) 330 and combined with (e.g. subtracted from) a reference signal corresponding to full design brightness of the array at logic element (or difference amplifier) 340 and the resulting signal provided to any closed loop compensator (PI) 350 which provides a signal to control the operating frequency of a digitally controlled oscillator (DCO) or voltage controlled oscillator (VCO) 360 to make small adjustments in switching signal frequency to slightly alter the gain of the resonant power converter. The output of the VCO or DCO 360 is then supplied to an AND gate or similar logic 370. Logic 370 also receives the output of comparator 320 as an input and outputs bursts of pulses having durations corresponding to the PWM dimming signal. The VCO output is also provided to the PWM dimming circuit 310 to assure that the ramp waveform is synchronized therewith, as illustrated at 380, such that an integral number of VCO output pulses are supplied in each burst and that the initial and final VCO pulses are not randomly foreshortened, as will be discussed in greater detail below. In each burst, the pulse frequency will be determined by the current feedback path and will thus be close to the resonant frequency of the resonant power converter, as illustrated by the waveforms of FIG. 4. Therefore, when a burst of pulses is delivered to Q1 and Q2, power is delivered to the LED strings and The LED strings will output light with full intensity but when the pulse train is interrupted, power to the LED strings will be interrupted and the LED strings will immediately become dark. Thus, the apparent brightness of illumination will correspond to the duty cycle of the PWM signal and any incremental degree of dimming (e.g. to well below 1% of full brightness) can be achieved. Moreover, any incremental arbitrary dimming ratio can be achieved without significant alteration of the switching frequency of the resonant power converter. (The term "incremental" is used since dimming using PWM necessarily is a function of the number of pulses in a PWM pulse burst and variation in brightness can be changed step-wise and not continuously although the difference in frequency between the nominal VCP frequency (e.g. about 120 KHz) and the PWM dimming cycle frequency (e.g. about 200 Hz) is very large and the incremental step-wise changes in brightness can be imperceptibly small and approaches being continuously variable.) Since the frequency of the PWM signal is far below the switching frequency of the resonant power converter, a plurality of switching frequency pulses in each PWM "on" period is also assured, even at very low dimming ratios.

It should be appreciated that when the PWM signal passes a burst of pulses to switches Q1 and Q2, the resonant power converter is being controlled as if it were operating at full load in a steady state mode of operation (although an actual steady state condition may not be reached during the burst as will be discussed in greater detail below) but when the pulses output by VCO 360 are interrupted by logic 370, the resonant power converter is in an idle state and no power is being delivered to the resonant circuit. Therefore, the transition between an idle state and a full load state introduces transients, as alluded to above, which, in turn, can cause dynamic oscillation of the output of the resonant power converter which may be perceptible to the human eye as reflected in the light output of the LED strings.

Figures 5A, 5B:
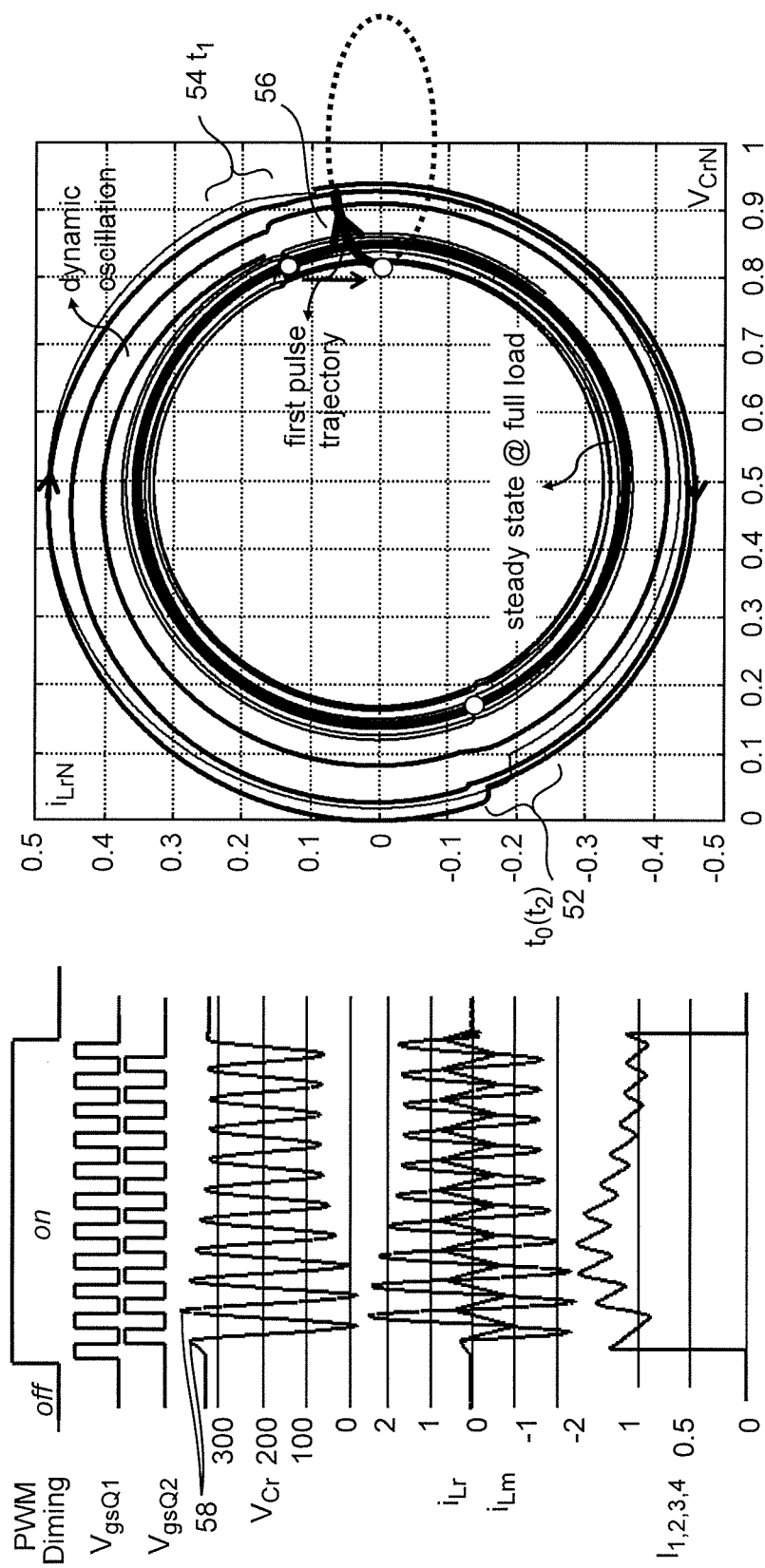

A detailed mathematical analysis of the dynamic oscillations is set out in "Optimal Trajectory Control of LLC Resonant Converters for LED PWM Dimming" by W. Feng et al. which has been published electronically by the IEEE Apr. 12, 2013 and is available from their website and which is hereby fully incorporated by reference. The article will be published in hard copy form in IEEE Transactions on Power Electronics, Volume 29, Issue 2, February, 2014, pp. 979-987. However, the dynamic oscillations that can and generally will be caused in the resonant power converter output can be sufficiently understood for practice of the invention from FIGS. 5A and 5B. FIG. 5A illustrates waveforms of the PWM signal, the control signals for Q1 and Q2 and the resulting waveforms of the voltage, $v_{Cr}$, on the resonant capacitor, and the currents in the resonant inductor, $i_{Lr}$, the magnetizing inductance, $i_{Lm}$, and the resulting current in the respective LED strings (or switches S1-S4), $i_{1,2,3,4}$. The variation in amplitude of the peak and valley magnitudes of these currents and voltages is readily apparent and the variation is a significant fraction of the peak and valley values. It should be noted that the resonant inductor waveform, $i_{Lr}$ is principally sinusoidal while the current waveform of the magnetizing current, $i_{Lm}$ is principally triangular and rises in average value following the transition from an idle state to an active state as a steady state is approached (but not necessarily reached due to termination of the pulse train by the PWM signal). It should also be noted that the peak and valley amplitude envelopes of the resonant inductor current, $i_{Lr}$, and resonant capacitor voltage, $v_{Lr}$, oscillate in approximate synchronism with each other.

FIG. 5B illustrates a so-called state trajectory representing these waveforms. A state trajectory can best be visualized as a graph of the current in the inductor(s) of a resonant circuit against the voltage on the capacitor(s) of a resonant circuit. As is well-understood in the art, when a resonant circuit is operated at its resonant frequency, energy in the form of the voltage on one or more capacitors or a current in one or more inductors is being circulated between such inductors and capacitors. Such currents may be plotted against such voltages and, when the resonant circuit is operating at a steady state, will produce a closed geometric conic section such as an ellipse. Since the plot reflects related changes in voltage and current over a continuum of instants, the plot is referred to as a trajectory in a state plane and a state trajectory, although recently developed, has proven to be a useful tool for analyzing steady state and transient behavior of resonant circuits and resonant power converter circuits, in particular.

When such steady state voltage and current values are suitably normalized in such a plot, the conic section will be a circle having a radius, ρ, corresponding to the normalized peak current and voltage since respective values are varying sinusoidally with equal amplitude and a phase difference of 90°. The circle will be centered at one-half of the input voltage. Such a plot can easily be developed (or visualized) as a Lissajous pattern on an oscilloscope.

Conversely, when a dynamic oscillation of amplitude of these signals is present, the oscillation will appear as a distortion of the circle (which may or may not be evident) and the amplitudes of these signals will be transiently varying (causing a change in diameter of the trajectory). Transients will appear as discontinuities in the circles of differing diameters and changes in amplitude will result in a spiraling shape of the trajectory; all of which features are represented in the state trajectory of dynamic oscillation in FIG. 5B. The distortions at the switching instants $t_0$, $t_2$ (the turn on instant of Q1) and $t_1$ (the turn on instant of Q2) are shown at 52 and 54, respectively.

It should be noted that, at the switching points, the resonant current is non-zero and the resonant capacitor voltage is slightly less than the maximum resonant capacitor voltage. To achieve zero voltage switching (ZVS), as is desirable, there should be current in the resonant tank circuit to charge and discharge the junction capacitances of the switches at the switching instant. It should also be noted that, as will be discussed in greater detail below, at the first turn-on time of Q1, $L_m$ participates in the resonance and causes an ellipse trajectory which, without optimal control in accordance with the invention, causes the corresponding elliptical trajectory to cross the steady state circle and cause oscillations. During these oscillations, the voltage/current trajectories are not exact half circles as illustrated by brackets at 52 and 54.

In the switching pattern using PWM, a conductive period of Q1 is provided before the first conductive period of Q2 and after the last conductive period of Q2 in a given PWM pulse burst. in order to minimize switching losses at the instant the pulse burst begins and the resonant power converter is placed into an active state from an idle state since the voltage when Q1 is turned off maintains the resonant capacitor voltage close to and within the trajectory of the steady state circle and thus reduces voltage when is again turned on at the first pulse of the next pulse burst. However, the transition between these operational states causes a serious dynamic oscillation in the resonant current which, in turn, increases conduction losses while the oscillation in resonant inductor current will reduce control accuracy of LED intensity.

In FIG. 5B, the full load steady-state trajectory is represented by the innermost circular trajectory and is so labeled. When Q1 is first turned on and power supplied to the converter, the secondary sides of the multi-channel power supply will not conduct due to the inductance in the circuit and the magnetizing inductance will participate in the resonance. The state trajectory for the resonant circuit including the magnetizing inductance will thus follow a portion of an ellipse labeled as the first pulse trajectory fully indicated by a dotted line. This portion of the elliptical trajectory begins when Q1 is turned on and is terminated when Q1 is turned off and determine the voltage on the resonant capacitor when Q2 is turned on and thus determines the starting point of the state trajectory that will be followed thereafter. The proximity of the termination of the first pulse trajectory and the switching point $t_1$ (54) can be observed in FIG. 5B. Therefore, this portion of the first pulse elliptical trajectory crosses the full load, steady state trajectory, causing increased peaks 58 in the resonant capacitor voltage which results in increased resonant currents and dynamic oscillation as the larger diameter trajectories diminish toward the steady state trajectory. It should be noted that conduction losses diminish resonant voltages and currents and tend to provide some degree of damping as reflected in spiral features of the trajectory, while changes in input and output current toward steady-state values of the resonant power converter can only occur at the switching instants 52, 54.

Figures 6A, 6B:
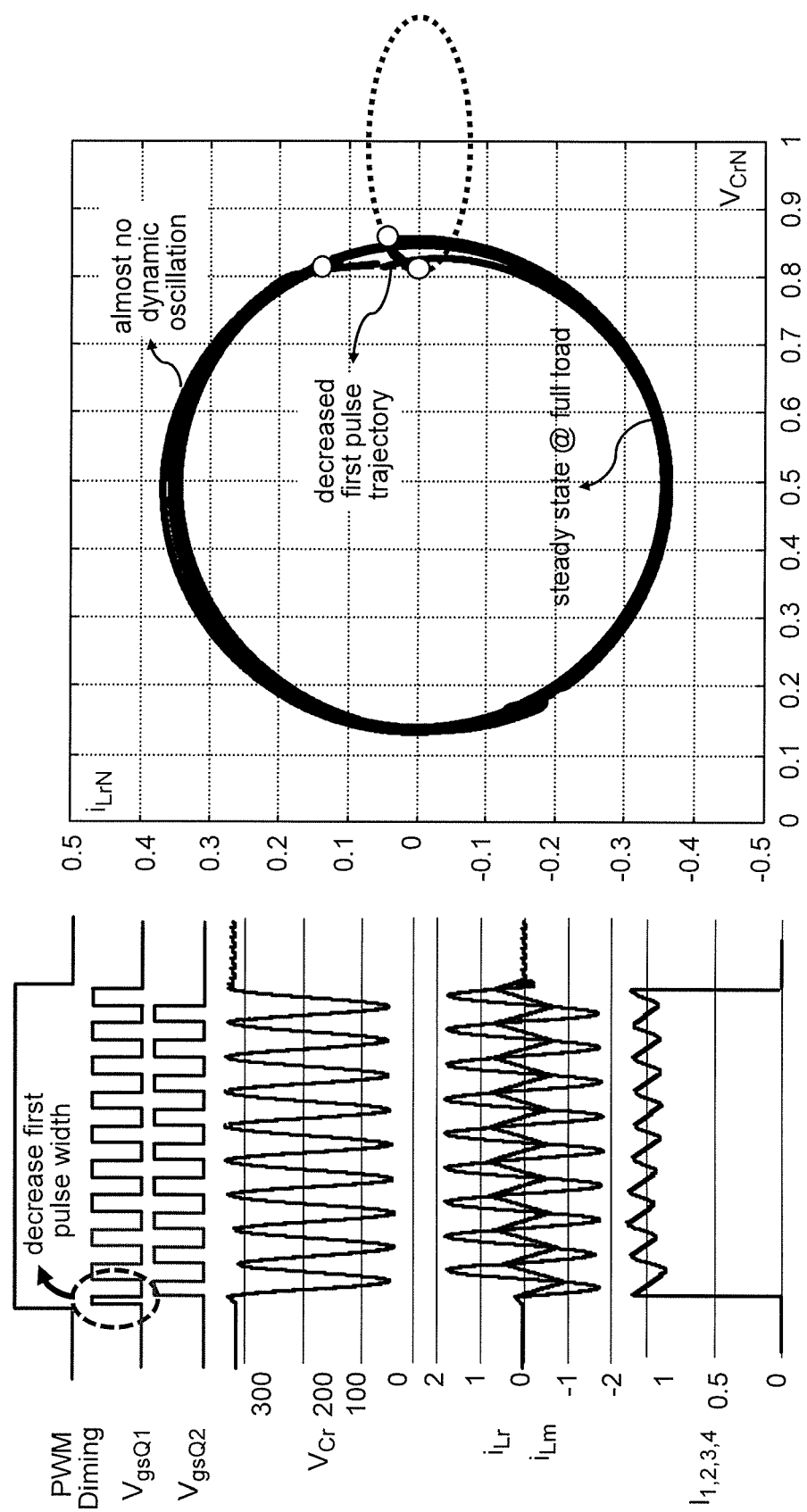
FIG. 6C illustrates normalization of a portion of an elliptical state trajectory for a technique of avoiding dynamic oscillation.
FIGS. 6D and 6E illustrate waveforms and a state trajectory for a change of resonant frequency of the resonant power converter after avoidance of dynamic oscillation in accordance with FIGS. 6A-6C, FIGS. 7A and 7B respectively illustrate wave forms and a state trajectory of dynamic oscillation to avoid dynamic oscillation in accordance with the invention by control of a last pulse of a PWM pulse train in accordance with a second embodiment of the invention.

The inventors have discovered that this behavior of the resonant power converter in response to a change from idle to active state can be minimized and substantially avoided by altering the duration of the first pulse of the PWM-defined pulse train, which is also the first conductive period of Q1, such that the first pulse trajectory terminates substantially at (and does not significantly cross) the full load steady-state trajectory. To understand this methodology, it should be observed that since the conductive periods of Q1 are provided prior and subsequent to conductive periods of Q2 and conduction through the resonant power converter is prevented between PWM pulse trains or bursts, the state trajectory during the dimming off-period of the PWM signal will correspond to zero current and a resonant capacitor voltage near the full load steady-state circle. Therefore, by shortening the duration of the first pulse, the PWM resonant converter can be tuned to track the steady state circle very quickly; substantially eliminating dynamic oscillation, as shown in FIGS. 6A and 6B. That is, by shortening the initial conductive period of Q1 (e.g. at the leading edge of the initial Q1 pulse) such that the voltage at the end of the period substantially coincides with the steady state trajectory, the steady state trajectory will be tracked almost immediately when Q1 is turned off and Q2 becomes conductive.

The duration of the first pulse can be estimated from an analysis of the state trajectory as will now be explained with reference to FIG. 6A. As alluded to above, when a given on-time ends in a given PWM dimming cycle, the voltage on the resonant capacitor will be equal to the full load, steady state voltage when Q1 is turned off (but Q2 is not turned on). That is (with the subscript N indicating a normalized value), $$v_{Cr,N}(t_n) = \pi \cdot I_{full}/n \cdot 1/V_{in}/Z_0 + 0.5$$

In other words, when the pulse train is interrupted by the turn-off of Q1 without turning on Q2 and assuming that full load steady state operation has been at least approached, the trajectory shifts vertically to a zero current location that will be slightly inside the full load, steady state circle. Because both Q1 and Q2 are non-conductive are turned off during the off part of the dimming cycle, the circuit is lossless and the resonant capacitor voltage, $v_{Cr}$, remains constant. Then, when the next pulse burst begins with the turn-on of Q1, the resonant capacitor voltage will be the same to start the portion of the elliptical trajectory discussed above.

Figure 6C:
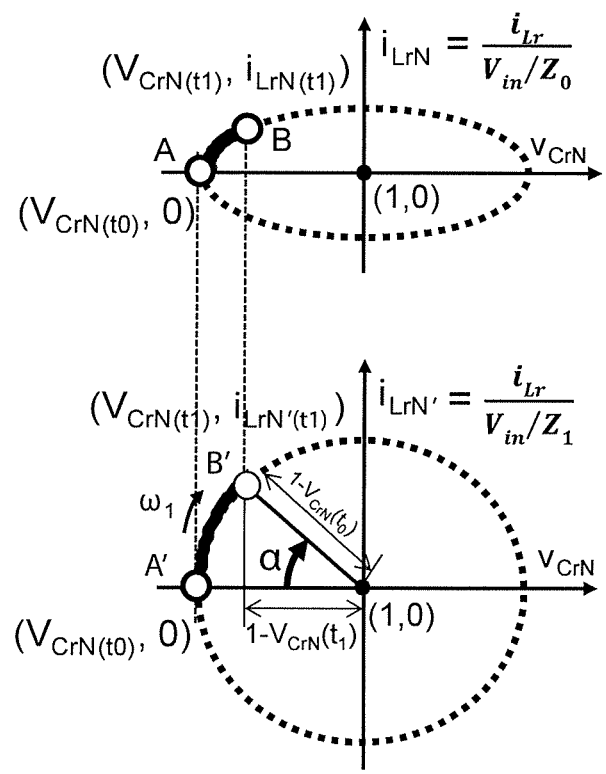

From that trajectory starting point, the distance along the elliptical trajectory to a desired connection point on the full load, steady-state trajectory is very much shorter than the Q1 first pulse trajectory of FIG. 5, discussed above, and, in accordance with the invention, Q1 is turned off and Q2 is turned on after a very short period. The short duration of the optimized Q1 first pulse trajectory may be estimated by normalizing the voltages and currents represented by the elliptical trajectory with $V_{in}/Z_1$ where $$Z_1 = ((L_r + L_m)/C_r)^{1/2}$$

so that it becomes a circular trajectory and determining the angle, $\alpha$, subtended by the arc of the circle defined by the points A', B' corresponding to the optimized trajectory from point a to point B along the ellipse, as shown in FIG. 6C. As alluded to above, the closed state trajectories depict cyclical variations of voltage and current that will occur and recur at a given frequency, f, which also corresponds to an angular frequency, $\omega$. Therefore, the distance along a circular arc, $\omega_1$ of a portion of a trajectory subtending angle $\alpha$ corresponds to a time interval. Thus the conduction angle of Q1, $$\alpha = \cos^{-1}((1 - v_{CrN}(A'))/(1 - v_{CrN}(B'))$$

can be converted into a time domain conduction time, T, of Q1, as $$T = \alpha/\omega_1 = \alpha/((L_r + L_m)/C_r)^{1/2}$$

where $\omega_1$ is the resonant frequency of $(L_r + L_m)$ with $C_r$. Therefore, by tuning the first pulse to have duration, T, the first pulse trajectory can be connected with a trajectory that will be (when Q1 is turned off and Q2 is turned on) the same current and voltage of the full load steady state trajectory and dynamic oscillation can be eliminated. This tuning can be accomplished in many ways that will be apparent to those skilled in the art such as simple delay of the leading edge of the first pulse with an RC circuit and logic gate that is disabled after a first pulse with a so-called one shot multivibrator. Alternatively, as may be preferred, the synchronization of VCO 360 and the PWM dimming circuit 310 can be shifted in phase to shorten the initial pulse while leaving other pulses for controlling Q1 and Q2 intact and suppressing any partial terminal Q2 pulse, as can be achieved with simple logic in a gate array. Another possible technique for digital application would be to program numbers of pulses for Q1 and Q2 for each dimming ratio in a field programmable gate array (FPGA) digital signal processor (DSP) or the like, implement the PWM control with a pulse counter and simply delay the leading edge of the initial Q1 pulse with and RC circuit and a logic gate.

Figure 6D:
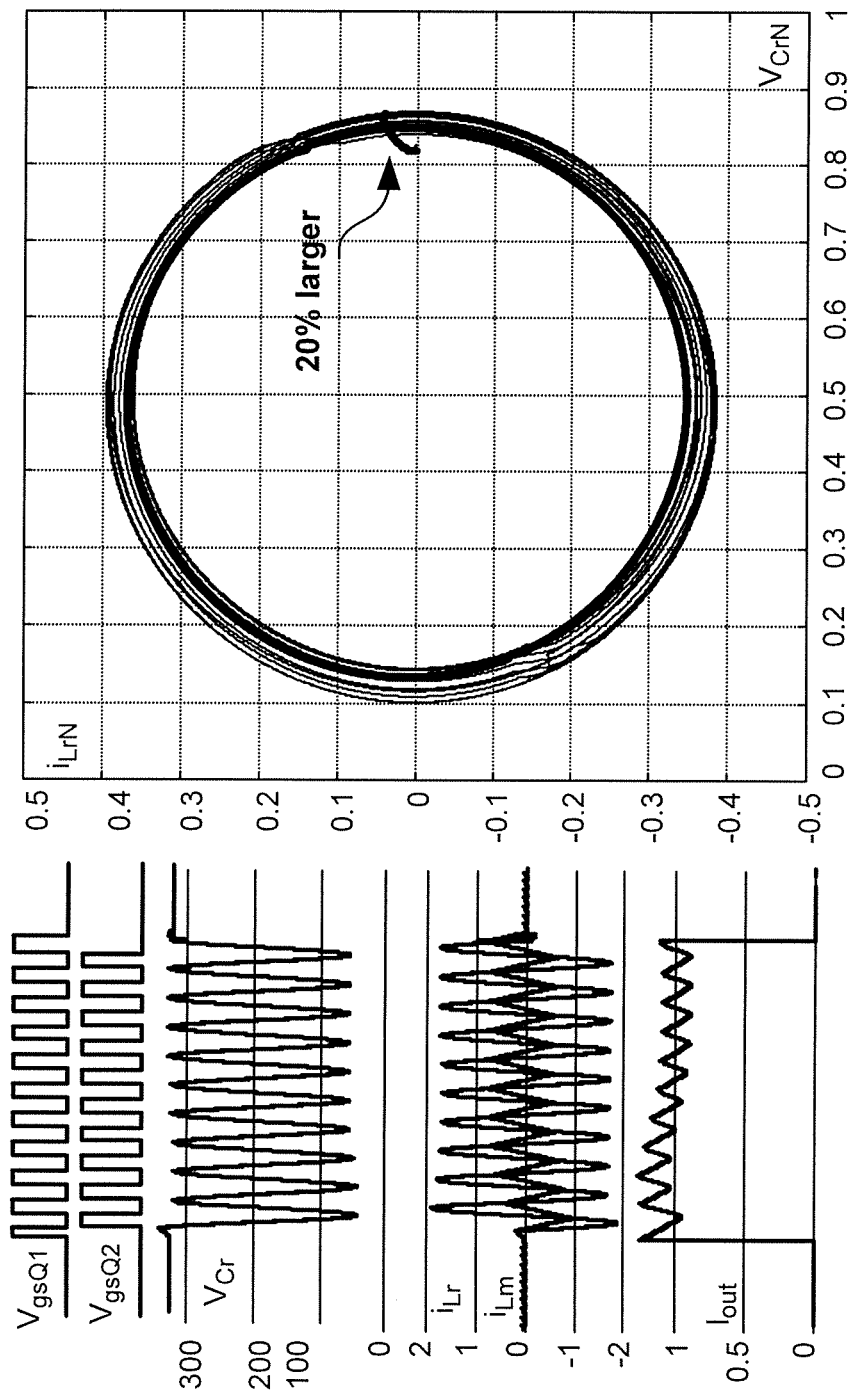
Figure 6E:
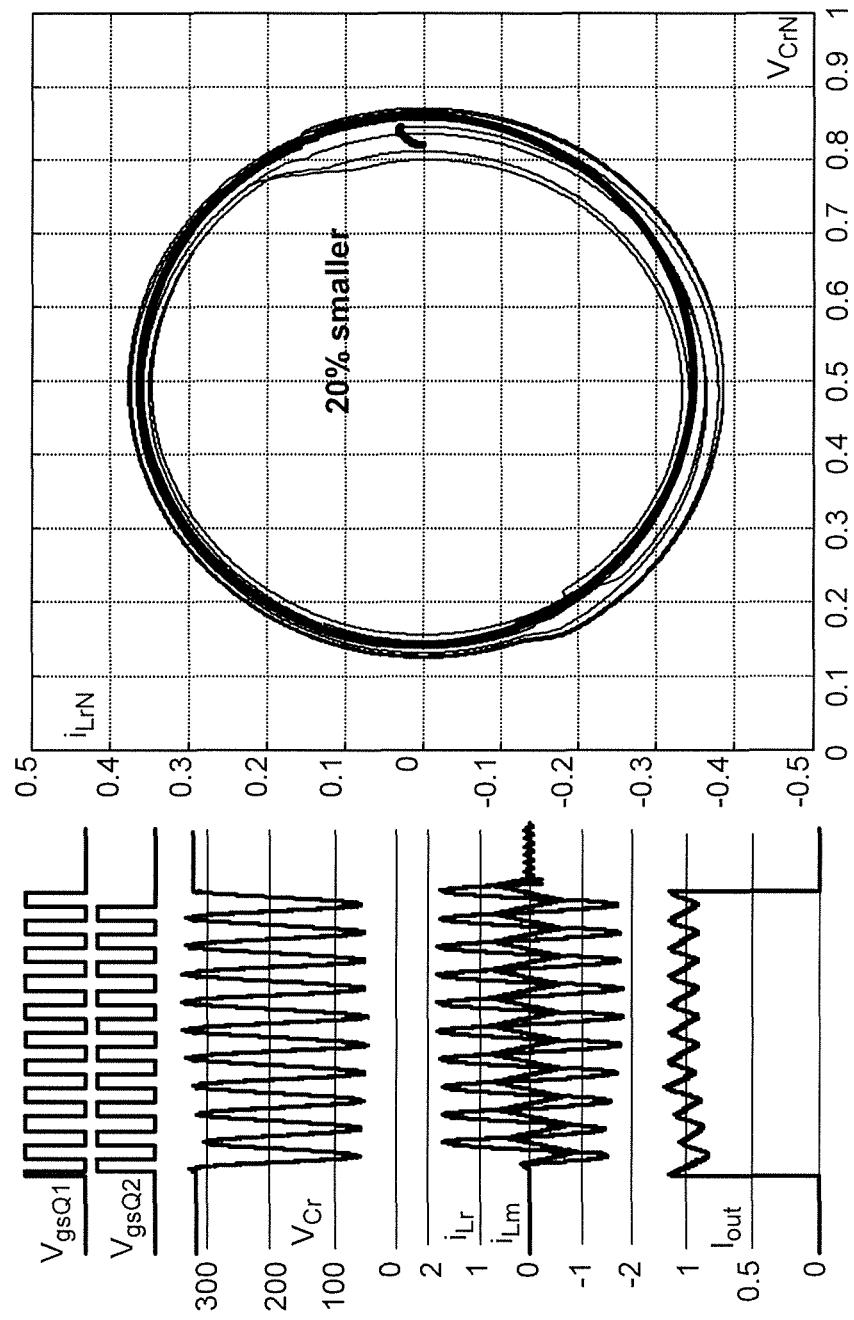

It has been found, however, that high accuracy in implementing the estimation for optimizing the first pulse duration is not necessary and that the optimum duration may change during operation and/or over time due to shifting of the resonant frequency caused by ambient temperature and/or aging of the inductors and capacitors. FIGS. 6D and 6E illustrate the waveforms and state trajectory for first pulse widths being 20% longer or shorter than the optimum for a given resonant frequency, respectively. These waveforms and state trajectories are valid to represent a similar shift of resonant frequency and a fixed first pulse duration. It is readily seen that dynamic oscillation remains very much reduced compared with FIG. 5 and that steady state conditions are reached much more rapidly.

Figures 7A, 7B:
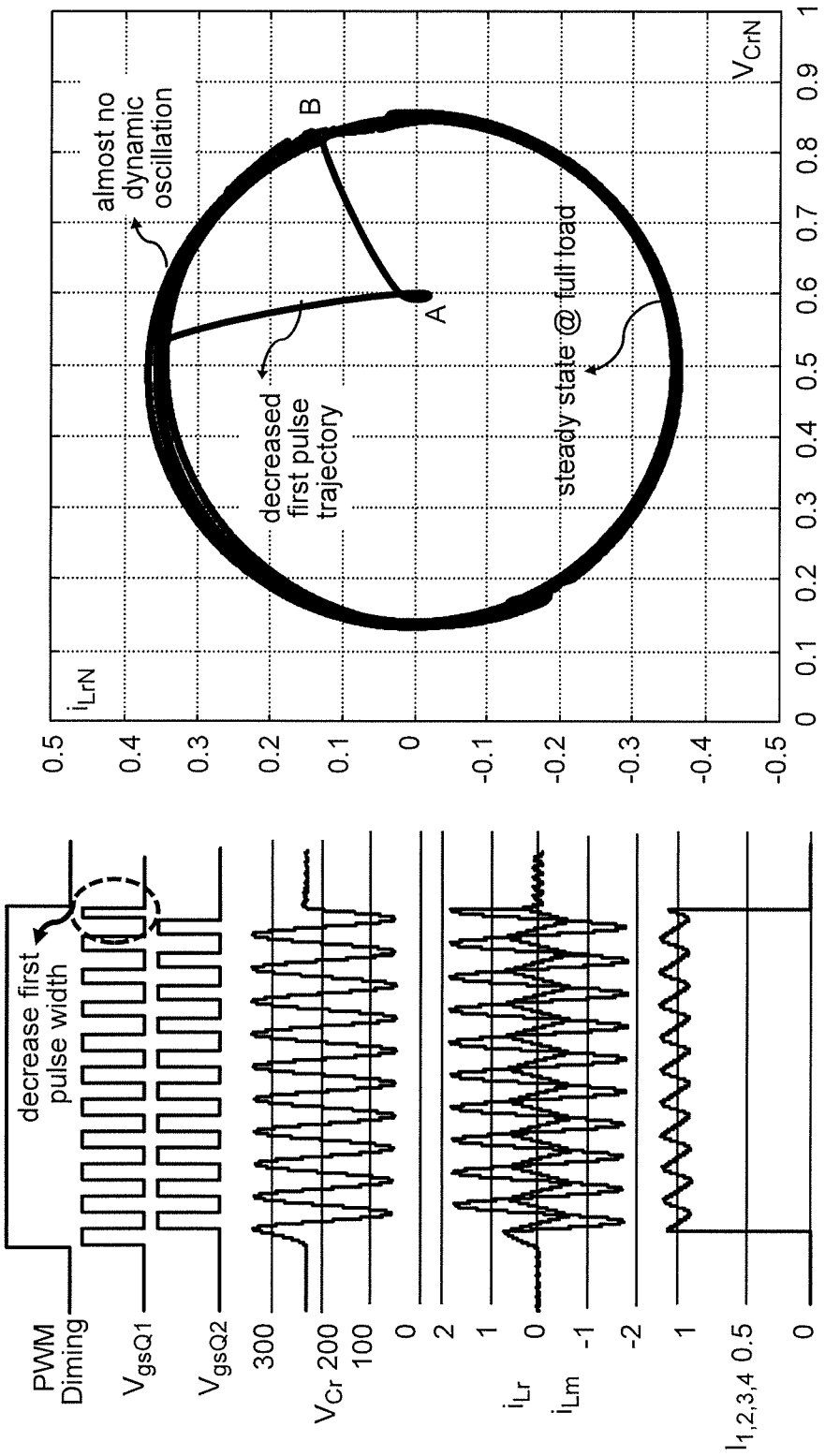
FIG. 7C illustrates a graphical analysis for an alternative technique for avoiding dynamic oscillation
FIGS. 7D and 7E illustrate waveforms and a state trajectory for a change of resonant frequency of the resonant power converter after avoidance of dynamic oscillation in accordance with FIGS. 6A-6C, FIGS. 8 and 9 illustrate waveforms of LED PWM dimming for 50% and 2% dimming ratios, respectively.

The inventors have also found that similar avoidance or reduction of dynamic oscillation can be achieved by tuning the last (Q1) pulse of a PWM pulse burst. Waveforms and a state trajectory representing a shortening of the last pulse of a PWM pulse burst are illustrated in FIGS. 7A and 7B. When the last pulse (with Q1 conductive) in a PWM pulse burst is terminated at an earlier time the state trajectory becomes substantially vertical as current is rapidly reduced to zero as described above when the last pulse of a burst is terminated normally at switching point 54 (FIG. 5). However, the instantaneous voltage is much lower and the current will be much higher; accounting for the significant apparent slope (actually along a portion along a circular trajectory of large radius since the resonant current is conducted by the body diode of Q2) as the current diminishes. Therefore, a voltage closer to the center of the circular full load steady-state trajectory as determined by the reduced width of the tuned last pulse. As before, this voltage is maintained constant through the period that the resonant power converter is in an idle state. When the next pulse burst begins, the magnetizing inductance will be included in the resonance as before since all conditions are the same except the resonant capacitor voltage and charge state and the state trajectory will follow an elliptical trajectory as before but with the trajectory shifted to begin at a lower voltage. Since, in this case, the first pulse width is unchanged at one-half the switching/resonant frequency (e.g. $T_0/2$), the conduction angle, $\alpha$, in the state plane normalized to transform the elliptical trajectory to a circle can be determined as $$\alpha = T_0/2 \cdot \omega_1 = \pi(L_r + L_m)).$$

Figure 7C:
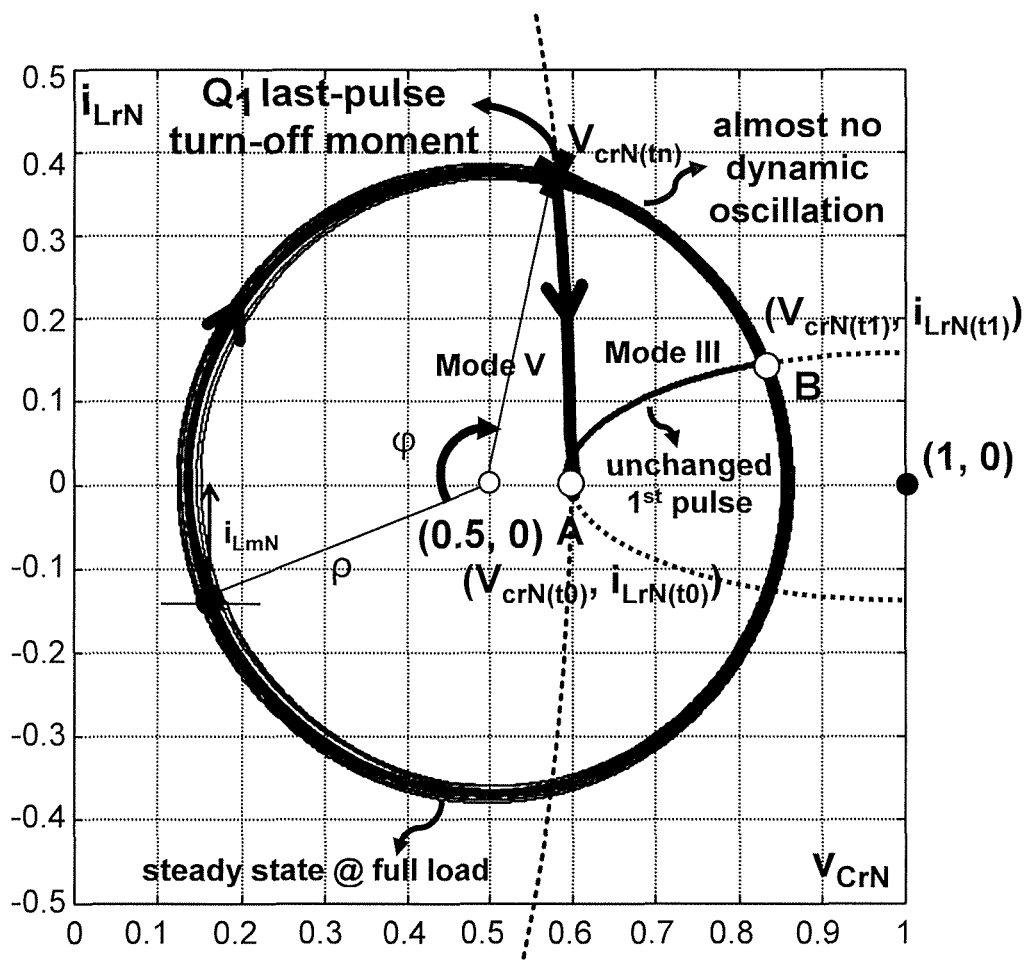

Thus, the coordinate point in the transformed state plane corresponding to point B' of FIG. 6A is $$v_{CrN}(B') = 1 - (1 - v_{CrN}(A'))\cos\alpha$$

$$i_{CrN}(B') = (1 - _{CrN}(A'))\sin\alpha$$

where N represents the normalizing factor as above. Converting the normalizing factor to $V_{in}/Z_0$, the normalized resonant current at point B of FIG. 7C is $$i_{CrN}(B) = 1 - (1 - _{CrN}(A))\cos\alpha \cdot Z_0/Z_1$$

which means that after a first pulse of $T_0/2$ duration, the elliptical trajectory beginning at point A will intersect with the full load, steady state circle trajectory and the switching time to place the voltage at point A can be found by solving the right-triangle equation:

$$(v_{CrN}(B) - 0.5)^2((i_{LrN}(A))^2 = \rho^2$$

to find the time or voltage at which the last pulse should be terminated to eliminate dynamic oscillation. Once the time or voltage at which the final Q1 pulse should be terminated, that termination can be implemented by phase shift of the VCO/PWM dimming circuit with suppression of a leading Q1 pulse, if needed, or use of a digital signal; processor (DSP) or counter and FPGA as discussed above.

Figure 7D:
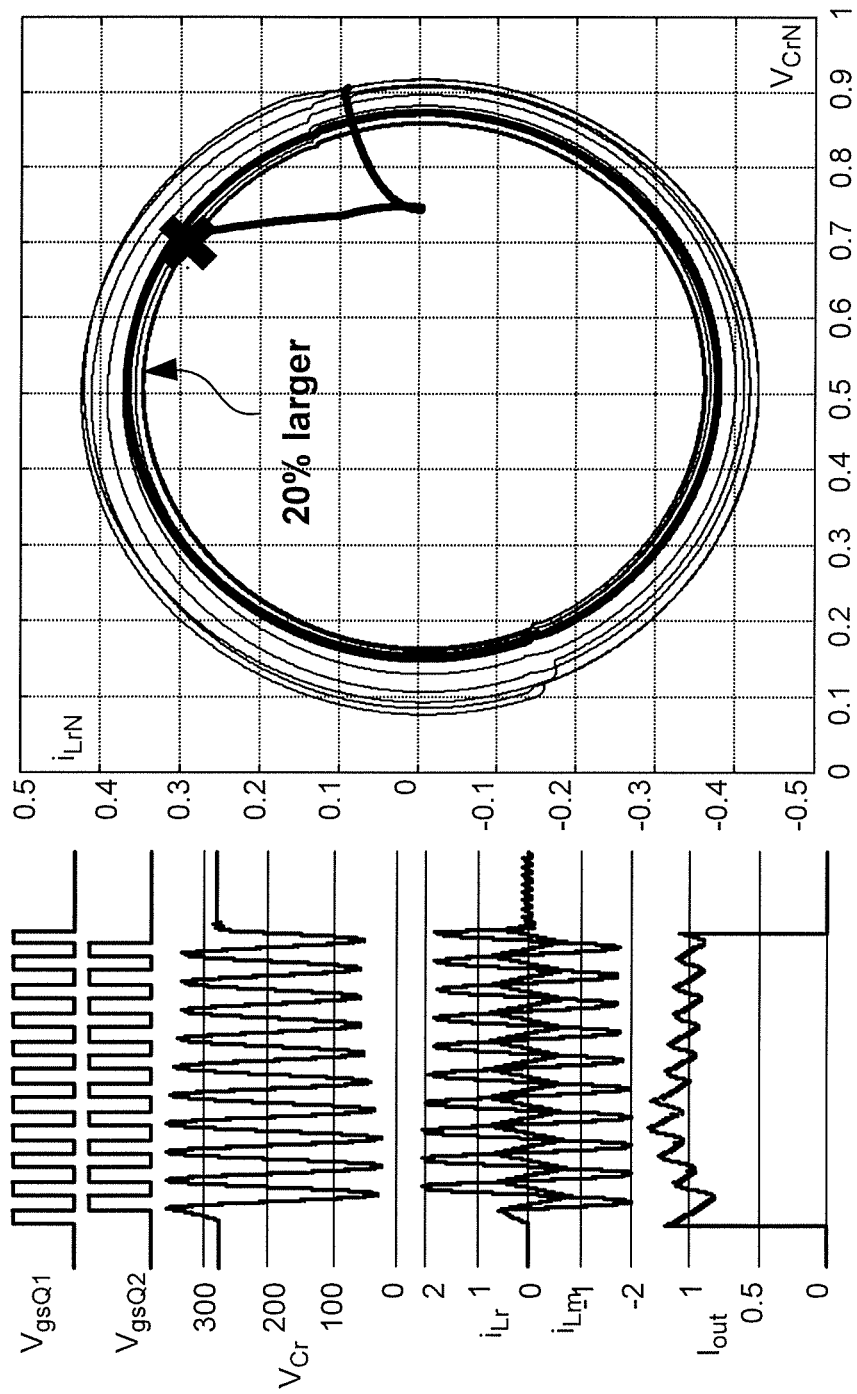
Figure 7E:
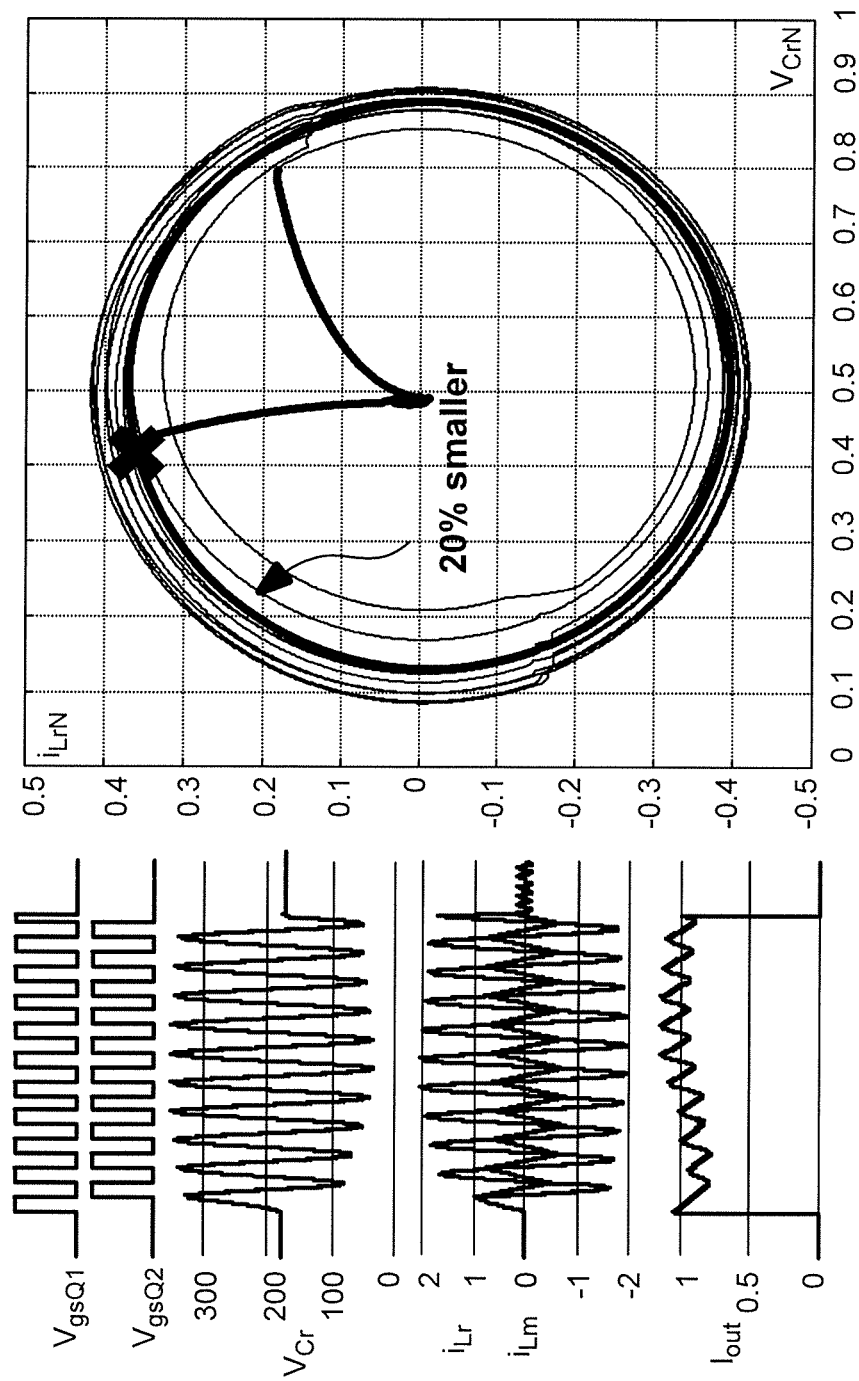

FIGS. 7D and 7E show waveforms and state trajectory for the cases where the voltage at point A is 20% larger and smaller than the estimate, respectively, for optimizing the last pulse of a pulse burst. Dynamic oscillation is larger than for the embodiment optimizing the first pulse of a pulse burst but still settles to the full load, steady state trajectory more quickly than when no last pulse optimization is performed. This reduced degree of dynamic oscillation is unlikely to be perceptible but represents a divergent of LED string brightness from proportionality to the duty cycle of the PWM. On the other hand, dynamic determination of the termination point of the last pulse may be more easily performed by a compensation circuit than for the case of first pulse optimization and compensation for temperature and aging of components of the resonant circuit may be accomplished automatically.

It should be appreciated that the above analyses and design methodologies for first pulse and last pulse optimization could be used together, as might be advantageous in some applications, to place the PWM off-time resonant capacitor voltage where it can rapidly and accurately reach the full load steady state trajectory. However, since either type of optimization can virtually eliminate dynamic oscillation, using both techniques is considered to be an unnecessary complication in view of the relatively slight improvement in performance that might be available by doing so.

On the other hand, it should also be appreciated From FIGS. 5D-5E and 7D-7E and the above discussion thereof that as long as no Q2 pulse precedes the initial Q1 pulse or follows the last Q1 pulse in a burst, any shortening of the first or last Q1 pulse in a burst will reduce voltage difference between the voltage state at the end of the pulse burst and the full load, steady state trajectory and thus reduce the magnitude and duration of dynamic oscillation caused by PWM dimming control using a resonant power converter and the tuning of the first and last pulses of a burst of switching pulses can be considered as a perfecting features of the invention not necessary to its successful practice in accordance with its most basic principles. That is, if the first and last pulses in a PWM VCO pulse burst are Q1 pulses, even a random shortening of either or both of those pulses will reduce dynamic oscillation to some finite degree although the magnitude and duration of the dynamic oscillation will not be predictable or controllable without synchronization 380 as discussed above. However, if such randomly reduced dynamic oscillation is tolerable, synchronization 380 need be no more than assuring that a Q2 control signal does not appear as a first or last pulse in a PWM burst by appropriate timing or logic.

Figure 8:
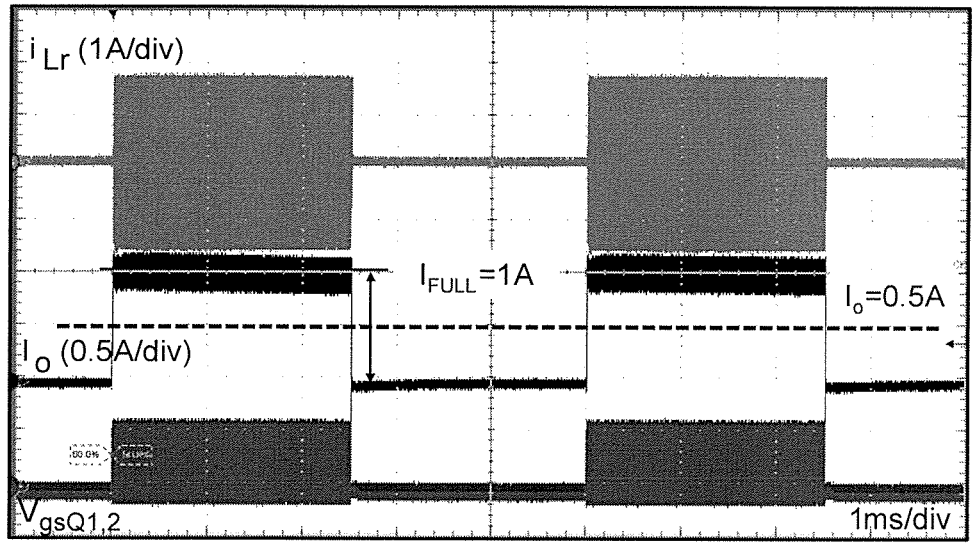
Figure 9:
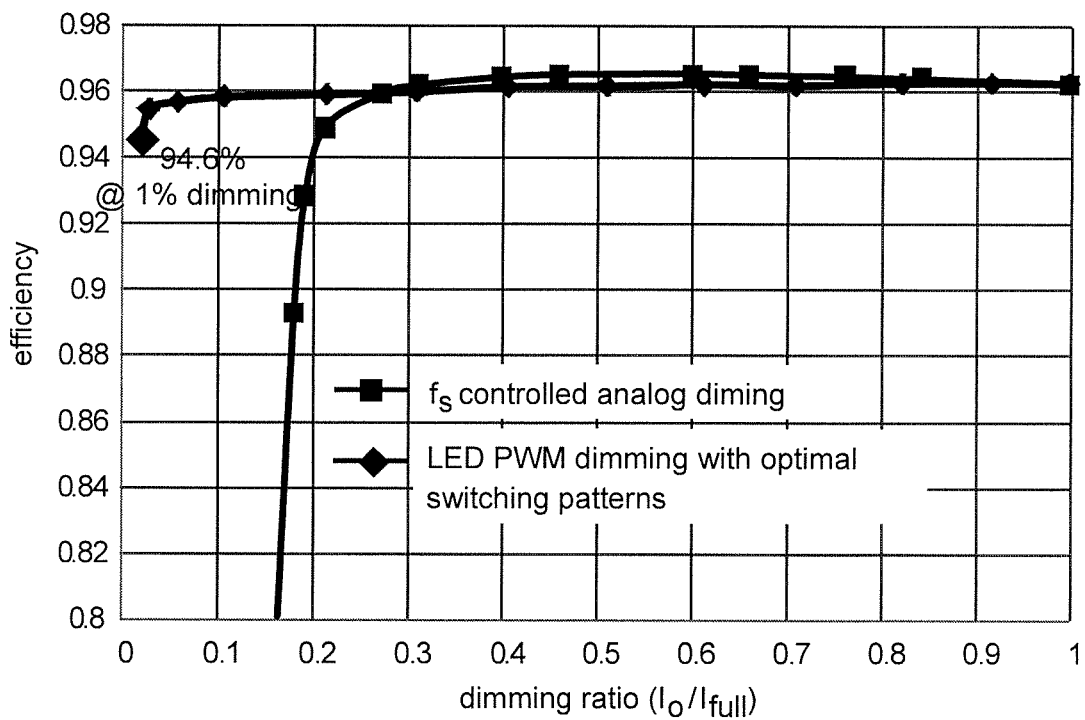
Figure 10:
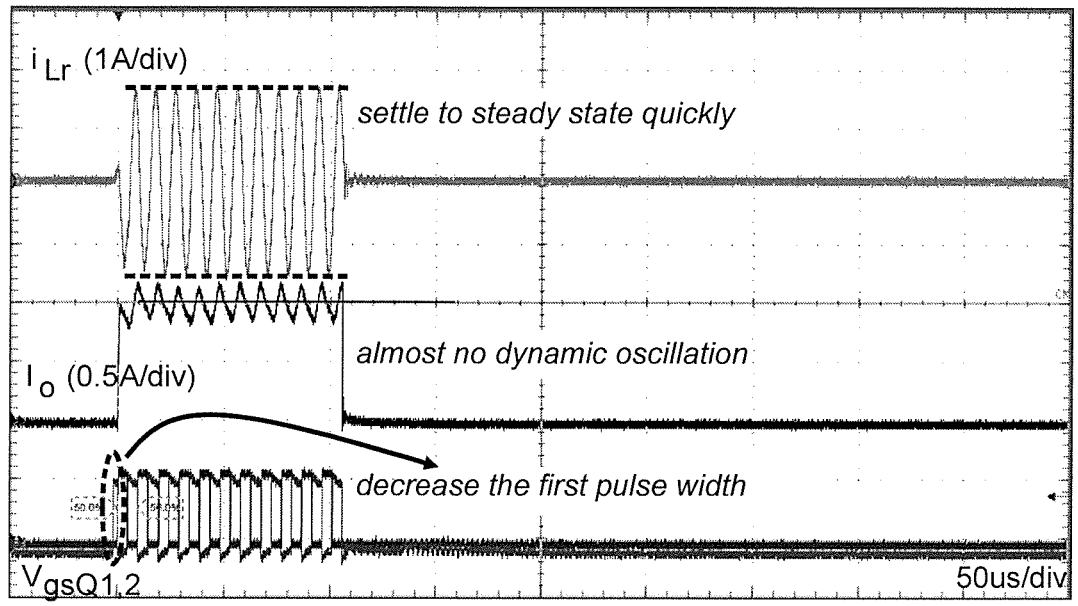
FIGS. 10 and 11 illustrate a detailed comparison of waveforms of LED PWM dimming with and without switching pattern control of the invention.
Figure 11:
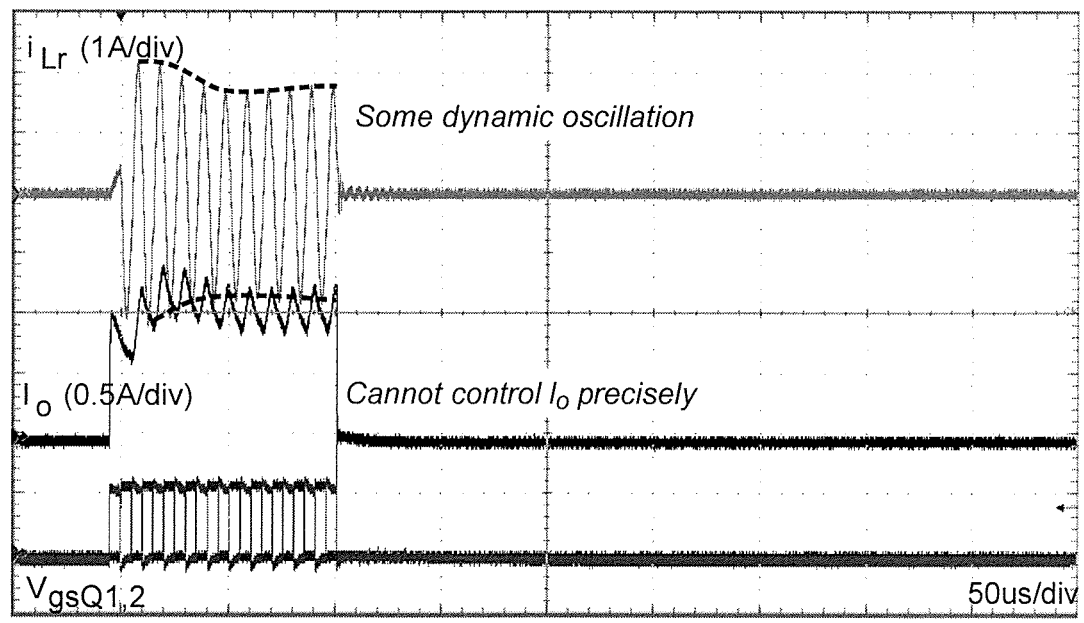
Figure 12A:
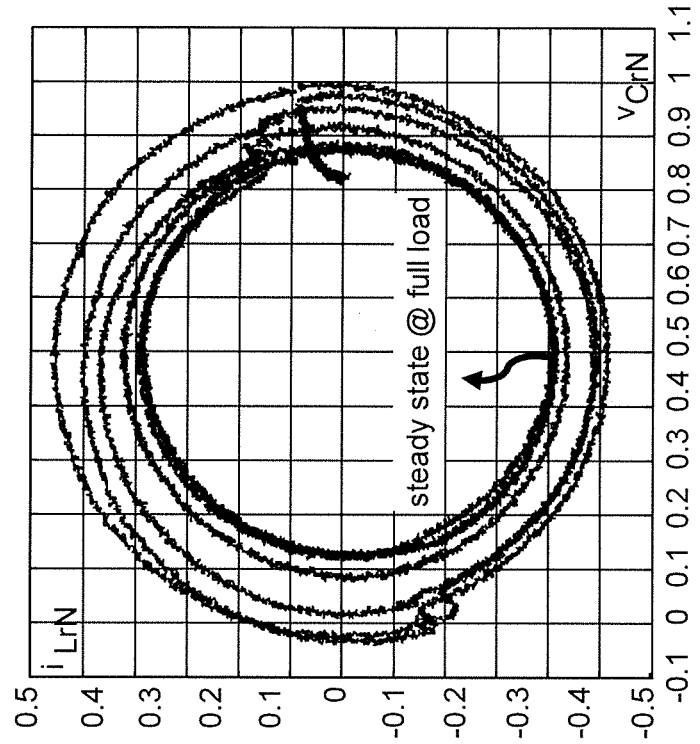
FIGS. 12A and 12B illustrate experimental state trajectory comparison with and without the switching pattern control of the invention, and, FIG. 12C illustrates a comparison of efficiency over a range of dimming ratios with and without the switching pattern control of the invention
Figure 12B:
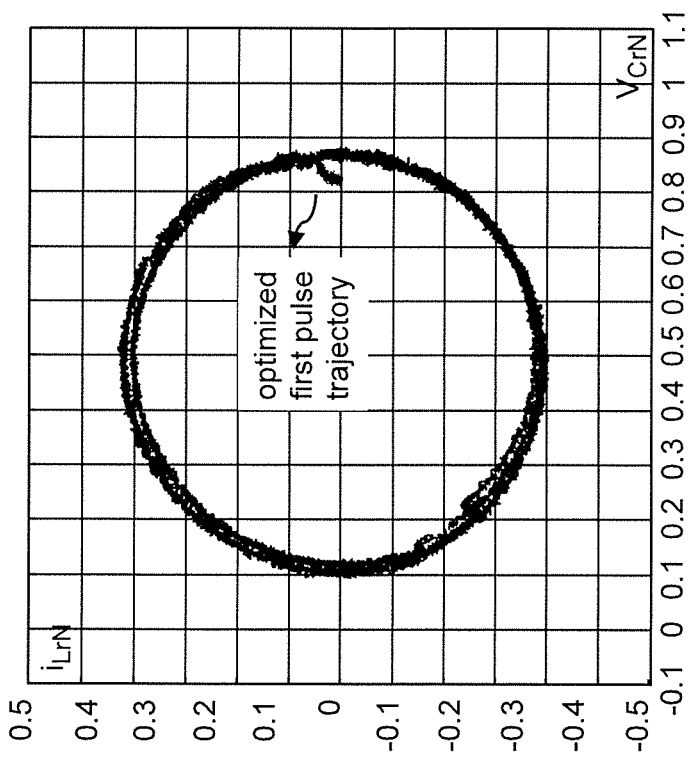
Figure 12C:
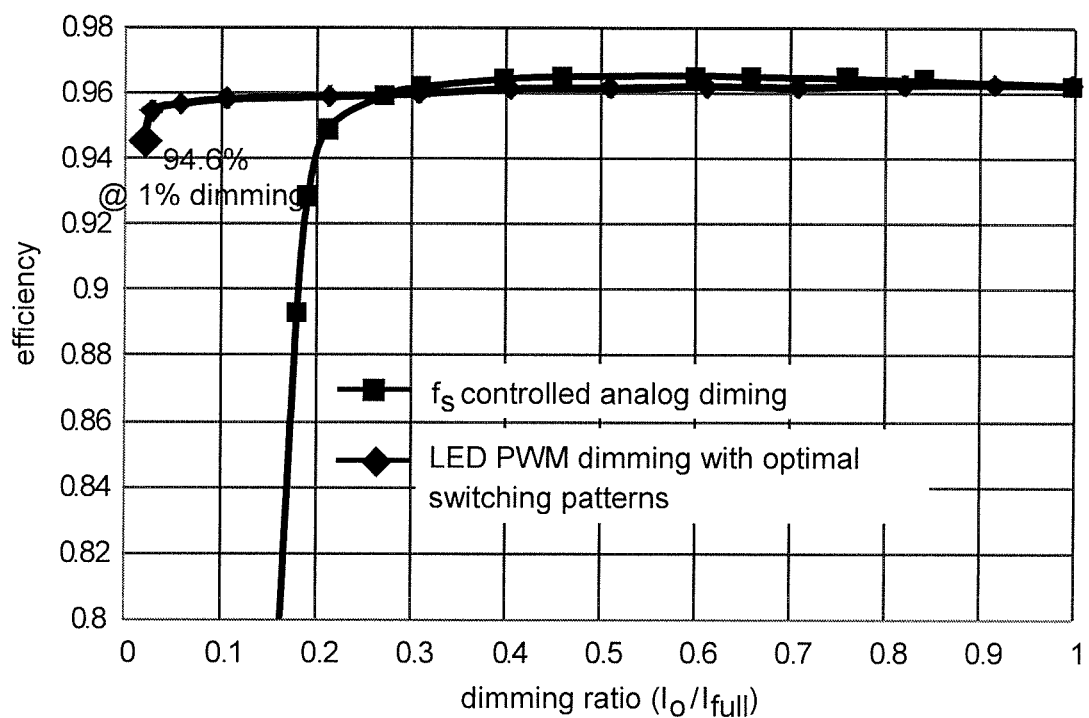

The efficacy of pulse optimization in PWM dimming of LEDs has been experimentally verified using a 200 W two channel $MC^3$ LLC resonant LED driver/power converter as depicted in FIG. 3 having parameters as shown in Table 1 of FIG. 3A. FIGS. 8 and 9 show the experimental waveforms when the dimming ratio is 50% and 2%, respectively. At any dimming ratio, the LLC power converter operates at full load during the PWM on-time. FIG. 10 shows the detail waveforms using the optimized switching pattern and, for comparison, FIG. 11 shows corresponding waveforms without optimization of the switching pattern. Similarly, FIGS. 12A and 13 show the experimentally derive state trajectories of the waveforms of FIGS. 10 and 11, respectively. All of these experimental results agree well with the analysis and methodology described above. Finally, FIG. 12C illustrates the gain in efficiency using PWM modulation for LED dimming using a resonant power converter in accordance with the invention over analog control of LED dimming described above in connection with FIGS. 1 and 2. Note that efficiency is maintained at above 94.6% down to a dimming ratio of 1%.

In view of the foregoing, it is seen that the invention provides for maintaining efficiency of operation for LED dimming using a resonant power converter over a greater range of dimming ratio than is practical with analog dimming control using a resonant converter. Optimization of the first pulse and/or the last pulse avoids or reduces dynamic oscillation that, whether or not perceptible variation in illumination is caused, avoids or reduces variation from proportionality of LED illumination intensity and the PWM duty cycle. Very high efficiency of the resonant power converter is maintained over all dimming ratios from full illumination to a dimming ratio of below 1%.

While the invention has been described in terms of a single preferred embodiment, those skilled in the art will recognize that the invention can be practiced with modification within the spirit and scope of the appended claims.

The invention claimed is:

1. A method of operating a resonant power converter, said method comprising steps of
   generating a pulse waveform comprising pulses at a first frequency for controlling generation of switching signals to control application of input power to said power converter,
   generating a pulse width modulated signal comprising pulses of controllable duty cycle at a second frequency, and
   periodically interrupting said pulse waveform in accordance with said pulse width modulated signal
   wherein said first frequency is sufficiently greater than said second frequency to form pulse bursts from said pulse waveform, each said pulse burst comprising at least three of said pulses.

2. The method as recited in claim 1, wherein said resonant power converter is a LLC resonant power converter.

3. The method as recited in claim 2 wherein said power converter is a multi-channel, constant current power converter.

4. The method as recited in claim 1, comprising a further step of
   shortening at least one of a first pulse and a last pulse of a pulse burst.

5. The method as recited in claim 4 wherein a first pulse is shortened such that the voltage on a resonant capacitor due to said first pulse of a subsequent pulse burst increases to correspond to a full load, constant current voltage on said resonant capacitor.

6. The method as recited in claim 4. wherein a last pulse is shortened such that the voltage on a resonant capacitor is brought to a voltage such that a first pulse of a subsequent pulse burst increases voltage on said resonant capacitor to correspond to a full load, constant current voltage on said resonant capacitor.

7. The method as recited in claim 1, wherein said step of generating a pulse waveform is synchronized with said step of generating a pulse width modulated signal such that bursts of pulses having an integral number of pulses of equal pulse width are produced.

8. The method as recited in claim 7, comprising a further step of
   shortening at least one of a first pulse and a last pulse of a pulse burst.

9. The method as recited in claim 8, wherein a first pulse is shortened such that the voltage on a resonant capacitor due to said first pulse of a subsequent pulse burst increases to correspond to a full load, constant current voltage on said resonant capacitor.

10. The method as recited in claim 8, wherein a last pulse is shortened such that the voltage on a resonant capacitor is brought to a voltage such that a first pulse of a subsequent pulse burst increases voltage on said resonant capacitor to correspond to a full load, constant current voltage on said resonant capacitor.

11. The method as recited in claim 1, wherein said step of periodically interruption said pulse waveform with said pulse width modulated signal shortens at least one of a first pulse and a last pulse of a pulse burst.

12. The method as recited in claim 11, wherein said step of generating a pulse waveform is synchronized with said step of generating a pulse width modulated signal such that bursts of pulses having an integral number of pulses with at least one of a first pulse and a last pulse of a pulse burst is shortened such that a first pulse of a subsequent pulse burst causes a voltage/current state of the resonant power converter to coincide with a full load steady-state voltage/current trajectory.

13. The method as recited in claim 11, wherein a first pulse is shortened such that the voltage on a resonant capacitor due to said first pulse of a subsequent pulse burst increases to correspond to a full load, constant current voltage on said resonant capacitor.

14. The method as recited in claim 11, wherein a last pulse is shortened such that the voltage on a resonant capacitor is brought to a voltage such that a first pulse of a subsequent pulse burst increases voltage on said resonant capacitor to correspond to a full load, constant current voltage on said resonant capacitor.

15. A resonant power converter comprising
    a switching circuit for connecting and disconnecting a resonant circuit and a source of power,
    a waveform generator for generating a pulse waveform to control said switching circuit, and
    a pulse width modulator for interrupting said pulse waveform to generate pulse bursts having at least three pulses in each pulse burst.

16. A resonant power converter circuit as recited in claim 15, further including
    means for shortening at least one of a first pulse and a last pulse of a pulse burst.

17. A resonant power converter circuit as recited in claim 16, wherein said means for shortening at least one of a first pulse and a last pulse includes said pulse width modulator.

18. A resonant power converter circuit as recited in claim 15, wherein said at least one of said first pulse and said last pulse is shortened such that a first pulse of a subsequent pulse burst charges a resonant capacitor to a voltage/current state that coincides with a full load steady-state voltage/current trajectory of said resonant power converter.

19. A light emitting diode array including a resonant power converter wherein said resonant power converter comprises
    a switching circuit for connecting and disconnecting a resonant circuit and a source of power,
    a waveform generator for generating a pulse waveform to control said switching circuit, and
    a pulse width modulator for interrupting said pulse waveform to generate pulse bursts having at least three pulses in each pulse burst.

20. A light emitting diode array as recited in claim 19, wherein said resonant power converter is a LLC resonant power converter.

* * * * *